(12) United States Patent
Finn et al.

(10) Patent No.: US 7,821,972 B1
(45) Date of Patent: Oct. 26, 2010

(54) SYSTEM AND METHOD FOR BUILDING LARGE-SCALE LAYER 2 COMPUTER NETWORKS

(75) Inventors: Norman W. Finn, Livermore, CA (US); Anusankar Elangovan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 909 days.

(21) Appl. No.: 11/238,925

(22) Filed: Sep. 29, 2005

(51) Int. Cl.
H04L 12/28 (2006.01)
H04L 12/56 (2006.01)
G06F 15/16 (2006.01)

(52) U.S. Cl. ............... 370/256; 370/395.53; 370/401; 370/408; 709/252

(58) Field of Classification Search ............... 370/255, 370/256, 395.53, 401, 408; 709/229, 252
See application file for complete search history.

(56) References Cited

U.S. PATENT DOCUMENTS

| | | | |
|---|---|---|---|
| 5,018,133 A * | 5/1991 | Tsukakoshi et al. ......... 370/256 |
| 5,394,402 A | 2/1995 | Ross |
| 5,742,604 A | 4/1998 | Edsall et al. |
| 5,959,968 A | 9/1999 | Chin et al. |
| 5,959,989 A * | 9/1999 | Gleeson et al. ............. 370/390 |
| 6,134,599 A * | 10/2000 | Chiu et al. .................. 709/252 |
| 6,163,543 A | 12/2000 | Chin et al. |
| 6,188,694 B1 * | 2/2001 | Fine et al. ................... 370/402 |
| 6,236,659 B1 * | 5/2001 | Pascoe ....................... 370/404 |
| 6,298,061 B1 | 10/2001 | Chin et al. |
| 6,515,969 B1 * | 2/2003 | Smith ......................... 370/256 |
| 6,628,624 B1 | 9/2003 | Mahajan et al. |
| 6,741,592 B1 | 5/2004 | Edsall et al. |
| 6,813,250 B1 | 11/2004 | Fine et al. |

(Continued)

OTHER PUBLICATIONS

Sodder, Arnold, Hierarchical LAN Services: Providing Scalability in L2 Virtual Private Networks by Using a MAC-n-MAC Frame Encapsulation and a Larger Service-tag, IEEE 802.1 Interim Meeting, Jan. 2003, pp. 1-20.

(Continued)

Primary Examiner—Dang T Ton
Assistant Examiner—Ryan C Kavleski
(74) Attorney, Agent, or Firm—Cesari and McKenna, LLP

(57) ABSTRACT

A grand computer network is formed from layer 2 (L2) networking technology in which groups of Provider L2 bridges are organized into formations, and different formations are interconnected via network-network interface (NNI) links. Customer sites are coupled to the formations. Customers identify their traffic, e.g., frames, by labeling or tagging it with a Customer Virtual Local Area Network (VLAN) Identifier (C-VLAN ID) or Customer Service Instance (CSI). Within the formations, the C-VLAN ID is mapped to a Service VLAN ID (S-VLAN ID) or Provider Service Instance (PSI), and the S-VLAN ID is appended to the customer traffic. The PSIs are hierarchical, such that each PSI belongs to at most one other "outer" or higher-level PSI, but may itself own any number of "inner" or lower-level PSIs. As a given frame traverses through the different formations of the Grand Network via the NNI links, the frame acquires an encapsulation, sheds an encapsulation or exchanges its current encapsulation for a different one. Bridges within the formations run a Hierarchical Spanning Tree Program (HSTP) to block intra-formation loops, and a GARP L2-NNI Registration Protocol (GLRP) to block inter-formation loops.

13 Claims, 7 Drawing Sheets

U.S. PATENT DOCUMENTS

| | | | |
|---|---|---|---|
| 6,937,576 | B1 | 8/2005 | Di Benedetto et al. |
| 6,944,130 | B1 | 9/2005 | Chu et al. |
| 7,286,491 | B1* | 10/2007 | Smith .................. 370/256 |
| 2003/0037162 | A1* | 2/2003 | Kotser .................. 709/236 |
| 2003/0225908 | A1* | 12/2003 | Srinivasan et al. ......... 709/243 |
| 2004/0081171 | A1 | 4/2004 | Finn |
| 2004/0081180 | A1* | 4/2004 | De Silva et al. ........... 370/402 |
| 2004/0218551 | A1* | 11/2004 | Goldberg et al. ........... 370/256 |
| 2004/0221087 | A1* | 11/2004 | Benedetto et al. .......... 710/316 |
| 2005/0080912 | A1 | 4/2005 | Finn et al. |
| 2005/0108432 | A1* | 5/2005 | Tominaga et al. .......... 709/245 |
| 2005/0135275 | A1* | 6/2005 | Hester et al. ............. 370/256 |
| 2006/0007867 | A1* | 1/2006 | Elie-Dit-Cosaque et al. .................. 370/241.1 |
| 2006/0007939 | A1* | 1/2006 | Elangovan ............ 370/395.53 |
| 2007/0258390 | A1* | 11/2007 | Khan et al. .............. 370/256 |

OTHER PUBLICATIONS

Finn, Norman, Spanning the World with Ethernet: The Five Rules that Ensure Interoperability Among Ethernet Service Providers on a Global Scale, Spanning the World Rev. 7, IEEE 802.1 Presentation, 2001.
Metz, Chris, Interconnecting ISP Networks, IEEE Internet Computing, IEEE, Mar.-Apr. 2001, pp. 74-80.
Finn, Norman, "Layer 2 Core" Issues List, IEEE 802.1 Interim, Oct. 2004, pp. 1- 50.
Lasserre et al., Transparent VLAN Services over MPLS (draft-lasserre-tls-mpls-00.txt), IETF Internet Draft, Aug. 2001, pp. 1-11.
Finn, N., Bridge-Based Ethernet Services Provision, IEEE 802.1, Oct. 5, 2002, pp. 1-59.
Finn, N., Bridge-Based Ethernet Service Provision, IEEE 802.1, Oct. 12, 2002, pp. 1-57.
Ethernet over MPLS for the Cisco 7600 Series Internet Routers, Cisco Systems, Inc., Jun. 5, 2002, pp. 1-27.
MPLS Traffic Engineering Fast Reroute-Link Protection, Cisco Sytems, Inc. Aug. 2, 2001, pp. 1-24.
Securing Networks with Private VLANs and VLAN Access Control Lists, Document ID: 10601, Cisco Systems, Inc., Mar. 15, 2005, pp. 1-23.
Understanding and Configuring Private VLANs, Cisco Systems, Inc., Sep. 12, 2002, pp. 1-12.
Cisco Metro Solutions Portfolio, Cisco Systems, Inc., Cisco Systems, Inc., 2001, pp. 1-13.
Tolley, Bruce, Strategic Directions Moving the Decimal Point: An Introduction to 10 Gigabit Ethernet, White Paper, Cisco Systems, Inc., 2000, pp. 1-17.
Dynamic Packet Transport Technology and Applications Overview, White Paper, Cisco Systems, Inc., 1999, pp. 1-17.
Dynamic Packet Transport Technology and Performance, White Paper, Cisco Systems, Inc., 2000, pp. 1-13.
Lasserre, M., MPLS Based Transparent LAN Services, River Stone Networks, Inc., 2001-2002, pp. 1-10.
Martini, et al., Transport of Layer 2 Frames Over MPLS, IETF Internet Draft, Apr. 2002, pp. 1-16.
Martini, et al., Encapsulation Methods for Transport of Layer 2 Frames Over IP and MPLS Networks, IETF Internet Draft, Nov. 1, 2001, pp. 1-14.
Configuring Spanning Tree, Cisco Sytems, Inc., Dec. 10, 2001, pp. 1-60.
Multiprotocol Encapsulation over ATM Adaptation Layer 5, Network Working Group Request for Comments: 2684, Sep. 1999, pp. 1-22.
Kotrla, et al., Re: [PWE3] RE: [802.1] 802.1ad Customer FCS Retention, IETF, Nov. 2003, pp. 1-5.

* cited by examiner

SYSTEM AND METHOD FOR BUILDING LARGE-SCALE LAYER 2 COMPUTER NETWORKS

CROSS-REFERENCE TO RELATED APPLICATIONS

This invention is cross-related to the following co-pending application, which is hereby incorporated by reference in its entirety:

U.S. patent application Ser. No. 10/279,360, filed Oct. 24, 2002 for a LARGE-SCALE LAYER 2 METROPOLITAN AREA NETWORK, and published as Publication Number US 2004-0081171 A1 on Apr. 29, 2004, now issued as U.S. Pat. No. 7,292,581.

BACKGROUND OF THE INVENTION

1. Field of the Invention

This invention relates to computer networks and, more specifically, to large-scale networks.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Ethernet

Ethernet is one of the most common LAN standards used today. The original Ethernet transmission standard, referred to as 10Base-T, is capable of transmitting data at 10 Megabits per second (Mbs). In 1995, the Institute of Electrical and Electronics Engineers (IEEE) approved a Fast Ethernet transmission standard, referred to as 100Base-T, which is capable of operating at 100 Mbs. Both 10Base-T and 100Base-T, however, are limited to cable lengths that are less than 100 meters. A committee of the IEEE, known as the 802.3z committee, is currently working on Gigabit Ethernet, also referred to as 1000Base-X (fiber channel) and 1000Base-T (long haul copper), for transmitting data at 1000 Mbs. In addition to the substantially increased transmission rate, Gigabit Ethernet also supports cable lengths of up to 3000 meters. Gigabit Ethernet thus represents a potentially significant increase in the size or range of Ethernet LANs.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping to problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE has promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by to the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Rapid Spanning Tree Protocol

Recently, the IEEE issued a new version of the 802.1D standard, known as IEEE Std. 802.1D-2004, that describes a rapid spanning tree protocol (RSTP) to be executed by otherwise 802.1D compatible devices. The RSTP similarly selects one bridge of a bridged network to be the Root Bridge and defines an active topology that provides complete connectivity among the LANs while severing any loops. Each individual port of each bridge is assigned a port role according to whether the port is to be part of the active topology. The port roles defined by the 802.1w specification standard include Root, Designated, Alternate and Backup. The bridge port offering the best, e.g., lowest cost, path to the Root Port is assigned the Root Port Role. Each bridge port offering an alternative, e.g., higher cost, path to the Root Bridge is assigned the Alternate Port Role. For each LAN, the one port providing the lowest cost path to the Root Bridge from that LAN is assigned the Designated Port Role, while all other ports coupled to the LAN are assigned the Root, Backup or, in some cases, the Alternate Port Role. At the Root Bridge, all ports are assigned the Designated Port Role.

Those ports that have been assigned the Root Port and Designated Port Roles are placed in the forwarding state, while ports assigned the Alternate and Backup Roles are placed in a state. A port assigned the Root Port Role can be rapidly transitioned to the forwarding state provided that all of the ports assigned the Alternate Port Role are placed in the blocking state. Similarly, if a failure occurs on the port currently assigned the Root Port Role, a port assigned the Alternate Port Role can be reassigned to the Root Port Role and rapidly transitioned to the forwarding state, provided that the previous Root Port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new Designated Port can rapidly transition to the forwarding state.

Like the STP described in the IEEE Std. 802.1D-1998 specification standard, bridges running RSTP also exchange BPDUs in order to determine which roles to assign to the bridge's ports. The BPDUs are also utilized in the handshake employed to rapidly transition Designated Ports to the forwarding state.

Virtual Local Area Networks

A computer network may also be segmented into a series of logical networks. For example, U.S. Pat. No. 5,394,402, issued Feb. 28, 1995 to Ross (the "'402 patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-1998 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

The IEEE has also promulgated a specification standard for a Spanning Tree Protocol that is specifically designed for use with networks that support VLANs. The Multiple Spanning Tree Protocol (MSTP), which is described in the IEEE Std. 802.1Q-2003, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-1998 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may but typically do not compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined with the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include a system ID extension. The system ID extension corresponds to the MSTI ID. The MSTP compatible bridges within a given Region will thus have a different bridge ID for each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN to MSTI tables in their BPDUs. Instead, the MST BPDUs carry only a digest of the VLAN to MSTI table or mappings. The digest is generated by applying the well-know MD-5 algorithm to the VLAN to MSTI table. When a bridge receives an MST BPDU, it extracts the MST Configuration ID contained therein, including the digest, and compares it to its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

FIG. 1 is a highly schematic block diagram of an MST BPDU 100. The MST BPDU 100 includes a header 102 compatible with the Media Access Control (MAC) layer of the respective LAN standard, e.g., Ethernet. The header 102 comprises a destination address (DA) field, a source address (SA) field, a Destination Service Access Point (DSAP) field, and a Source Service Access Point (SSAP), among others. The DA field 104 carries a unique bridge multicast destination address assigned to the spanning tree protocol, and the DSAP and SSAP fields carry standardized identifiers assigned to the spanning tree protocol. Appended to header 102 is a BPDU message area that includes an "outer" part 104 and an "inner" part 106. The outer part 104 has the same format as an RSTP BPDU message and is recognized as a valid RSTP BPDU message by bridges that do not implement MSTP. The "inner" part 106 is utilized by bridges executing MSTP to establish the IST and the MSTIs. The inner part 106 has a set of spanning tree parameters for the IST and a set of parameters for each MSTI supported by the bridge sourcing the MSTP BPDU 100.

Outer part 104, also referred to as the CIST priority vector, has a plurality of fields, including a protocol identifier (ID) field 108, a protocol version ID field 110, a BPDU type field 112, a flags field 114, a CIST root ID field 116, an external path cost field 118, a CIST regional root ID field 120, a CIST port ID field 122, a message age field 124, a maximum (MAX) age field 126, a hello time field 128, and a forward delay field 130. The CIST root identifier field 116 contains the identifier of the bridge assumed to be the root of the Common and Internal Spanning Tree, which may be in the same MSTP Region as the bridge sourcing the BPDU message 100, in another MSTP Region or in part of the bridged network that is not running MSTP. The external path cost field 118 contains a value representing the lowest cost from the bridge sourcing the BPDU 100 to the CIST root identified in field 116 without passing through any other bridge in the same region as the bridge that is sourcing the BPDU message 100.

Inner part 106, also referred to as an MSTI priority vector, similarly has a plurality of fields, including a version 1 length field 132, a null field 134, a version 3 length field 136, an MST configuration ID field 138, a CIST regional root ID field 140, a CIST regional path cost field 142, a CIST bridge ID field 144, a CIST port ID field 146, a CIST flags field 148, and a CIST hops field 150. Inner part 106 may further include one or more optional MSTI configuration messages 152, each of which constitutes another MSTI priority vector or M-record.

Because version 2 of the RSTP does not specify any additional fields beyond those already specified by version 1, the MST BPDU does not have a version 2 length field.

As mentioned above, the MST configuration ID field 138 is made up of three subfields: a configuration name sub-field 154, a revision level sub-field 156 and an MD-5 checksum sub-field 158. The configuration name sub-field 154 carries a variable length text string encoded within a fixed size, e.g., 32-octets. The revision level sub-field 156 carries an integer encoded within a fixed field of two octets. The MD-5 checksum sub-field 158 carries a 16-octet signature created by applying the MD-5 algorithm to the bridge's VLAN to MSTI table, which contains 4096 consecutive two octet elements.

Each MSTI Configuration Message 152 consists of a plurality of fields including a MSTI regional root ID field 160, a MSTI regional path cost field 162, a MSTI bridge ID field 164, a MSTI port ID field 166, a MSTI flags field 168 and a MSTI hops field 170. MST bridges utilize the STP parameters contained in fields 140-150 of inner part 106 and in each MSTI configuration message 152 to compute an active topology for each MSTI configured in the respective region.

Large Scale Computer Networks

Multiple LANs and/or end stations may be interconnected by point-to-point links, microwave transceivers, satellite hook-ups, etc. to form wide area networks (WANs) or metropolitan area networks (MANs) that may span several city blocks, an entire city or an entire continent. A WAN or MAN typically interconnects multiple LANs and/or end stations located at individual campuses and/or buildings that are physically remote from each other, but that are still within the metropolitan area. Conventional WANs and MANs rely on network equipment employing Asynchronous Transfer Mode (ATM) running over the existing Public Switched Telephone Network's (PSTN's) Synchronous Optical Network (SONET). As most LANs utilize the Ethernet standard, network messages or packets created at one LAN must be converted from Ethernet format into ATM cells for transmission over the SONET links. The ATM cells must then be converted back into Ethernet format for delivery to the destination LAN or end station. The need to convert each network message from Ethernet to ATM and back again requires the WAN or MAN to include expensive networking equipment. The WAN or MAN Provider also has to lease or otherwise obtain access to the SONET links. As a result, WANs and MANs can be expensive to build and operate.

Accordingly, a need exists for a system and method for building and operating large-scale computer networks more efficiently.

SUMMARY OF THE INVENTION

Briefly, the invention is directed to a system and method for creating large-scale, e.g., "grand", computer networks using layer 2 (L2) networking technology. Groups of Provider L2 bridges are preferably organized into formations, and different formations are interconnected via network-network interface (NNI) links. Connected to at least some of the formations are one or more customer sites, which are typically local area networks (LANs). Customers identify their traffic, e.g., frames, by labeling or tagging it with a Customer Virtual Local Area Network (VLAN) Identifier (C-VLAN ID). Each C-VLAN ID is also referred to as a Customer Service Instance (CSI). Upon receipt within the first formation, the C-VLAN ID specified by the customer's traffic is mapped to a unique Service VLAN ID (S-VLAN ID), which is also referred to as a Provider Service Instance (PSI). The S-VLAN ID may also be appended to the customer traffic. In accordance with the present invention, PSIs are configured and arranged to be hierarchical. More specifically, PSIs are preferably organized at least logically in a tree structure, such that each PSI belongs to at most one other "outer" or higher-level PSI, but may itself own any number of "inner" or lower-level PSIs. A given PSI may correspond to a single CSI, a single PSI, or some combination of CSIs and PSIs. Each PSI is characterized by a Global PSI ID. For each PSI defined within a given formation, moreover, the {PSI, formation} pair is referred to as the stratum. As a given frame traverses through the different formations of the Grand Network via the NNI links, the frame acquires an encapsulation, sheds an encapsulation or exchanges its current encapsulation for a different one. The preferred encapsulation is referred to as Q-in-Q-in QMAC encapsulation, which involves the addition of new source and destination Media Access Control (MAC) addresses as well as a new S-VLAN ID and a Pseudo-LAN VLAN ID (W-VLAN).

Rather than attempt to run a single spanning tree algorithm across the entire L2 network, the Provider Bridges are configured to run a novel algorithm referred to as the Hierarchical Spanning Tree Protocol (HSTP). By executing HSTP, the Provider Bridges organize themselves into formations and create one or more spanning tree instances within each formation. HSTP thus blocks the redundant links within the formations that might otherwise create loops. In the illustrative embodiment, there are two forms of HSTP: a rapid spanning tree protocol form (HSTP-R); and a multiple spanning tree protocol form (HSTP-M).

The present invention further includes a novel extension to the Generic Attribute Registration Protocol (GARP), which is referred to as the GARP L2-NNI Registration Protocol (GLRP). Essentially, GLRP blocks redundant links extending between different formations of the grand network that might otherwise create loops. Basically, by executing GLRP, the Provider Bridges determine whether a given NNI is blocked or forwarding for any given S-VLAN. In this way, loops between the formations are prevented. More specifically, the Provider Bridges within a formation identity all NNIs. Those NNIs that lead from the current formation to a higher level formation are referred to as lower NNIs. For each PSI/lower NNI pair within a given formation, the Provider Bridges, by executing GLRP, select only a single lower NNI for forwarding frames for that PSI. All other lower NNIs within the formation are blocked for that PSI. In this way, loops, which might otherwise exist due to the use of redundant NNI links between the formations are blocked.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
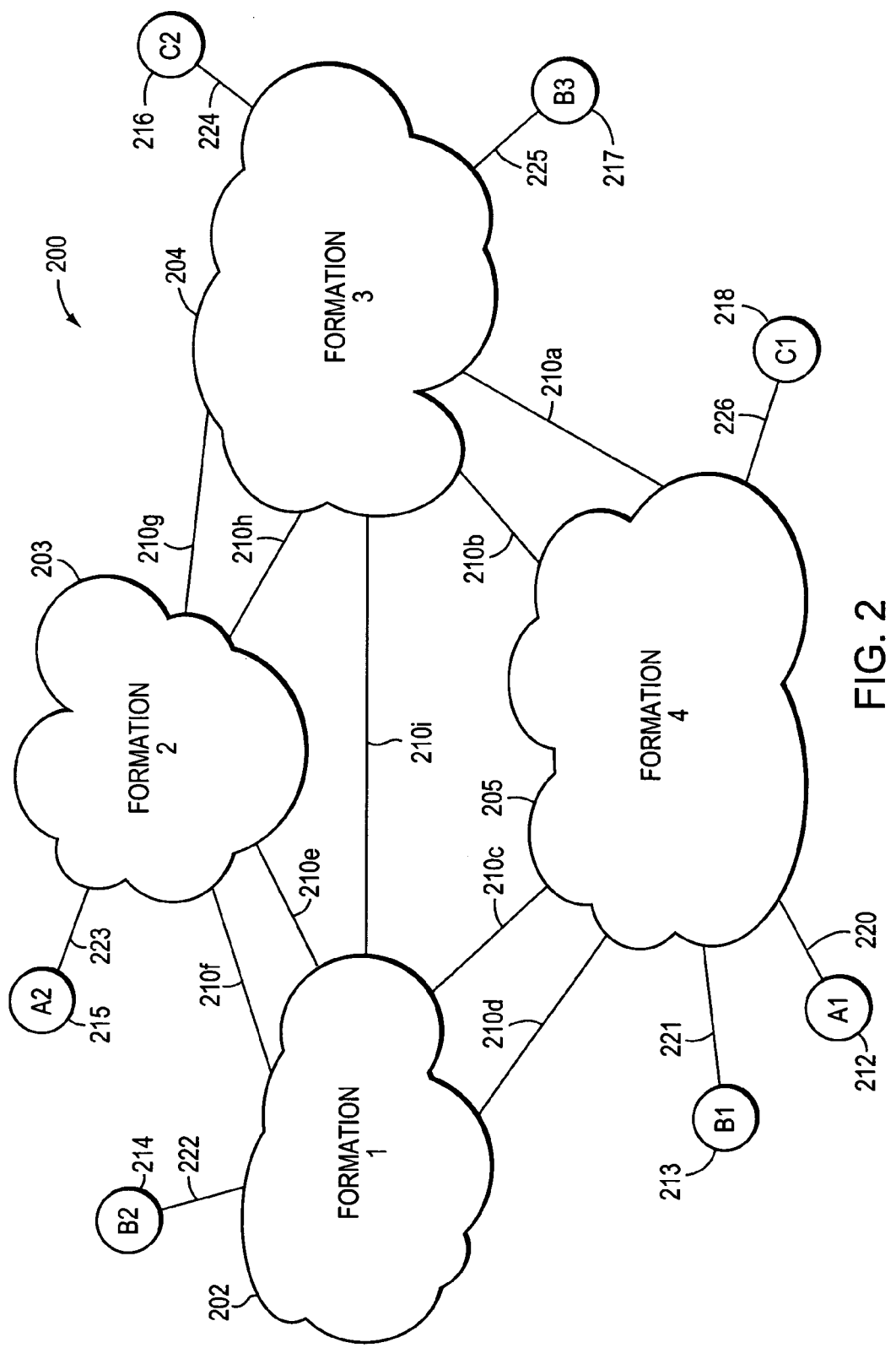
FIG. 2 is a highly schematic illustration of a L2 Grand Network.

FIG. 2 is a highly schematic illustration of a large-scale, e.g., "grand", layer 2 (L2) computer network 200 in accordance with the present invention. The grand network may span a region such as Europe, or an entire continent, such as North America. Grand network 200 is made up of a plurality of formations, such as formations 202-205, which are also identified as formations 1-4. Each formation 202-205 includes a plurality of interconnected Layer 2 (L2) intermediate network devices, such as Provider Bridges. In accordance with the preferred embodiment, each Provider Bridge conforms to the IEEE P802.1ad "Standard for Local and Metropolitan Area Networks—Virtual Bridged Local Area Networks—Amendment 4: Provider Bridges", the most current version of which is Draft 3.0, Oct. 25, 2004, which is hereby incorporated by reference in its entirety. Typically, each formation is operated by the same administrative entity, and therefore represents a separate administrative domain. Some or all of the individual formations, moreover, may be assigned to different administrators.

The formations are coupled together by corresponding Network-Network Interface (NNI) links 210*a-i*. Also, attached to at least some of the formations are one or more customer sites, such as customer sites 212-218. In the illustrative embodiment, each customer site comprises a plurality of entities or hosts, such as personal computers, workstations, servers, etc., which are all in the same physical location, and are interconnected to form one or more Local Area Networks (LANs), such as a bridged network, so that the entities may source or sink data frames to one another. As used herein, the term "same physical location" refers to a single building or a plurality of buildings on a single campus or within the area of roughly a single city block. The LANs at the customer sites may be interconnected by one or more customer operated intermediate network devices such as bridges, switches or routers.

Customer sites 212-218 will typically belong to different organizations, such as organization A, organization B and organization C. In particular, organization A includes customer sites 212 (A1) and 215 (A2). Organization B includes customer sites 213 (B1), 214 (B2) and 217 (B3). Organization C includes customer sites 218 (C1) and 216 (C2). Each customer site 212-218 is preferably coupled to at least one formation by a plurality of customer links 220-226. As described herein, a customer obtains various services from the grand network 200, such as interconnecting its sites that are geographically remote from each other. In this way, entities located at one customer site, e.g. A2, can communicate with the entities of another site, e.g. A1.

Those skilled in the art will recognize that many different internetwork connection technologies may be employed by the NNI links 210, such as Ethernet, Fast Ethernet, Gigabit Ethernet, Frame Relay, etc.

The grand network 200 of FIG. 2 is meant for illustration purposes only and is not meant to limit the invention. Indeed, grand network 200 will typically include many more customer sites, e.g., thousands.

Figure 3:
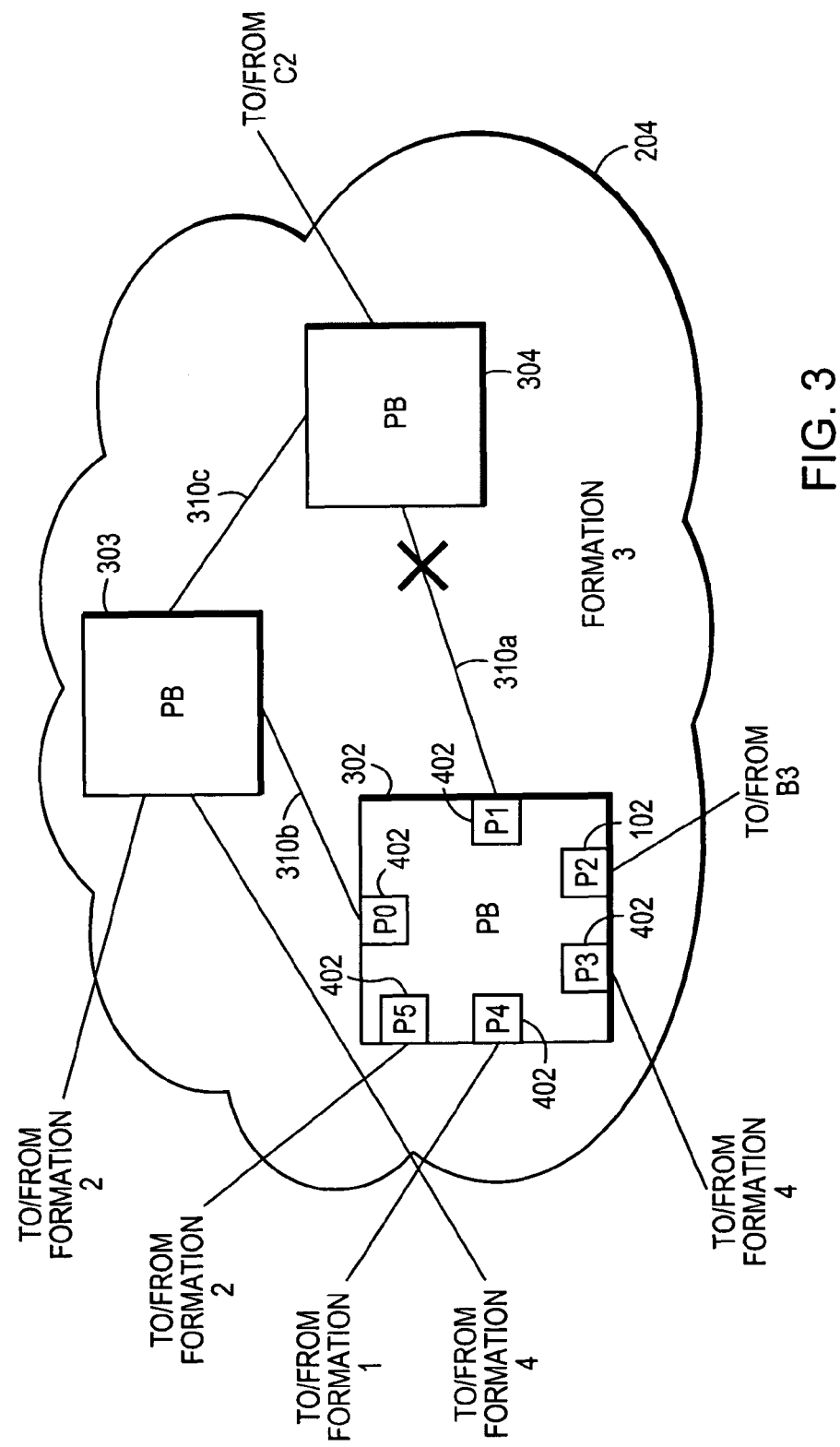
FIG. 3 is a highly schematic illustration of a formation within the Grand Network of FIG. 2.

FIG. 3 is a highly schematic illustration of formation 204, which is also identified as formation 3. Formation 204 includes a plurality of L2 intermediate network devices, such as Provider Bridges (PBs) 302-304. Each Provider Bridge includes a plurality of ports (P) 402 at least some of which are utilized to connect the Provider Bridges to the customer sites. Other ports 402 are coupled to inter-formation links 310a-c extending between the Provider Bridges 302-304. Inter-formation links 310 are preferably point-to-point links that carry network messages, such as frames, among the Provider Bridges. Each Provider Bridge 302-304, moreover, preferably identifies its own ports 402, e.g., by port numbers, such as port zero (P0), port one (P1), port two (P2), port three (P3), etc. Provider Bridges 302-304 are thus able to associate specific ports with the customer sites and/or other network devices, such as switches, coupled thereto.

At least some of the Provider Bridges of each formation may be classified into different categories. For example, a formation may have one or more Edge Provider Bridges, which are disposed at the boundary between the formation and one or more customer sites. The Edge Provider Bridges are directly coupled to the customer sites. Each formation also includes at least one Formation Boundary Provider Bridges that connect the formation to some other formation. With reference to FIG. 3, bridge 302 is both an Edge Provider Bridge, as it connects to customer site B3, and a Formation Boundary Provider Bridge as it connects to formations 1, 2 and 4. Bridge 304 is an Edge Provider Bridge, and bridge 303 is a Formation Boundary Provider Bridge.

Suitable intermediate network device platforms for use with the present invention include, but are not limited to, the commercially available Catalyst 4000 and 6000 series of switches from Cisco Systems, Inc. of San Jose, Calif.

Figure 4:
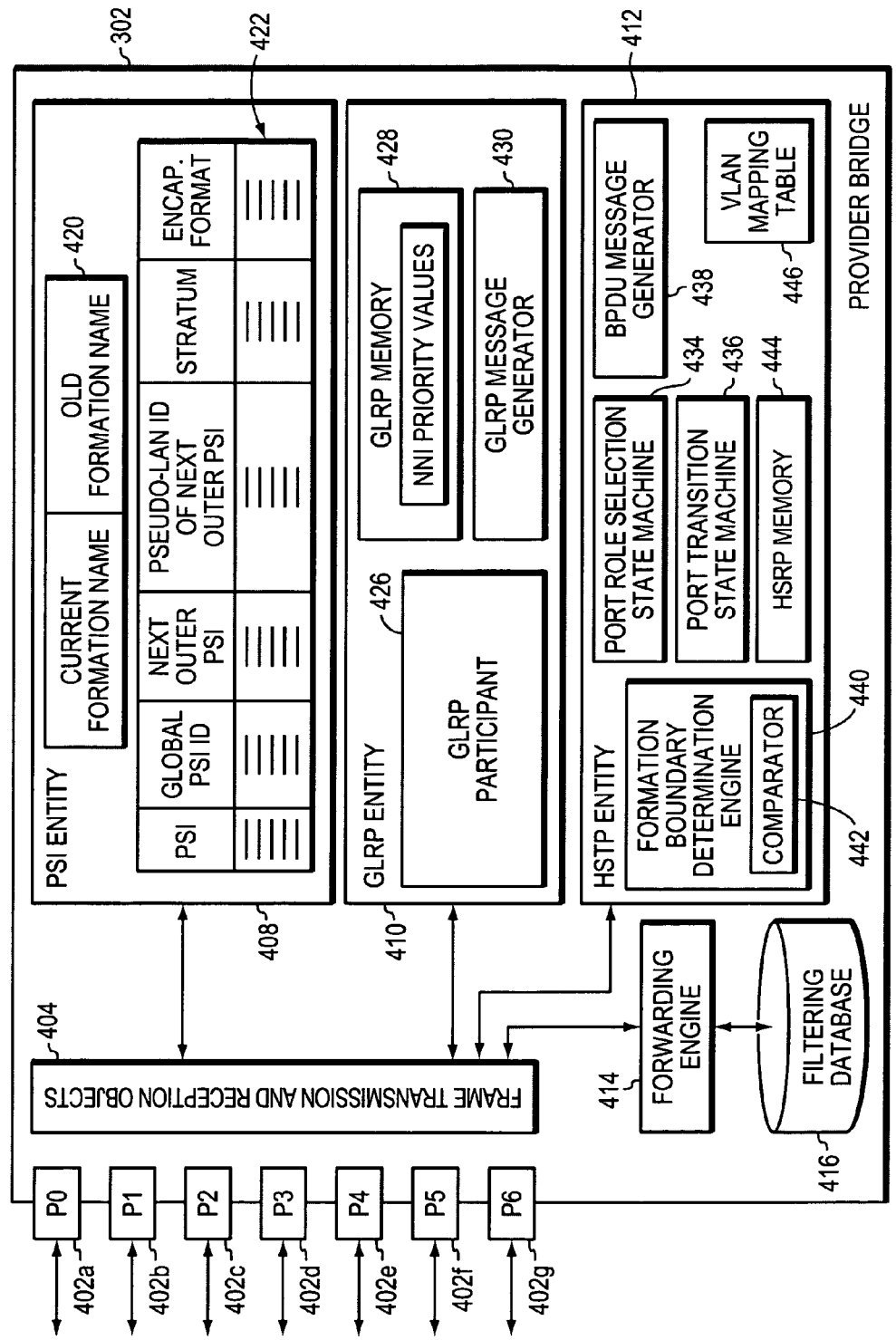
FIG. 4 is a partial, functional diagram of a Provider Bridge of the formation of FIG. 3.

FIG. 4 is a partial block diagram of a Provider Bridge, such as bridge 302. Provider Bridge 302 includes a plurality of ports 402a-402g each of which is preferably identified by a number (e.g., P0-P6). One or more frame transmission and reception objects, designated generally 404, are associated with the ports 402a-f such that network messages, including frames, received at a given port, e.g., P3, may be captured, and frames to be transmitted by Provider Bridge 302 may be delivered to the appropriate port, e.g., P1, for transmission. Frame reception and transmission objects 404 may include message storage structures, such as priority queues. In the illustrated embodiment, Provider Bridge 302 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures.

The Provider Bridges of the grand network 200 execute a new spanning tree protocol referred to as the Hierarchical Spanning Tree Protocol (HSTP) to block any loops within each of the formations that may result from the use of redundant inter-formation links 210. In the illustrated embodiment, HSTP is a modified version of either the Multiple Spanning Tree Protocol (MST) or the Rapid Spanning Tree Protocol (RSTP). The Provider Bridges also use HSTP to identify the boundaries between different formations and to identify those ports that are acting as Network-Network Interfaces (NNIs), i.e., ports that couple one formation to another.

Because the formations of the present invention may be interconnected in any desired manner, e.g., with redundant links, loops caused by the existence of these connections must be blocked. In accordance with the present invention, each Provider Bridge is further configured to run a new protocol, referred to herein as the GARP L2-NNI Registration Protocol (GRLP), where GARP refers to the Generic Attribute Registration Protocol. In this case, the attributes being registered are "lower NNIs" and the Provider Service Instances (PSIs), also referred to as S-VLANs, that can be transmitted through the lower NNIs. An S-VLAN is only unique within a single formation. Each formation within the grand network 200, moreover, is assigned a particular level within the grand network, although multiple formations can be at the same level. A lower NNI refers to a port or interface of a first formation that provides connectivity to a second formation that is at a higher level than the first formation. By operation of GLRP, each formation selects a single lower NNI for each S-VLAN. Frames associated with a given S-VLAN can only be forwarded through this one lower NNI to the next higher formation. In this way, loops that would otherwise exist due to the use of redundant or multiple links between formations are blocked.

To carry out the preferred embodiment of the present invention, each Provider Bridge, including bridge 302, is configured with a plurality of protocol entities, including hierarchical PSI entity 408, at least one GARP L2-NNI Registration Protocol (GLRP) entity 410, and at least one Hierarchical Spanning Tree Protocol (HSTP) entity 412. Provider Bridge 302 further includes at least one forwarding engine 414, and a filtering database 416.

The PSI entity 408 preferably includes a formation memory 420. In the preferred embodiment, the formation memory 420 stores both a current formation name value and an old formation name value. These values may be set during configuration by a network administrator. The PSI entity 408 further includes a PSI hierarchy memory 422, which may be organized as a table having a plurality of rows and columns whose intersections define cells for storing data. The PSI hierarchy memory 422 may include a PSI column 422a, a Global PSI ID column 422b, a Next Outer PSI column 422c, a Pseudo-LAN ID column 422d, a Stratum column 422e and an encapsulation format column 422f. The contents of the PSI hierarchy memory 422 may be set during configuration by the network administrator.

The GLRP entity 410 also includes a plurality of sub-components. The sub-components include a GLRP participant 426, a GLRP memory 428 and a GLRP message generator 430. The GLRP memory 428 stores, among other things, NNI priority values for the ports of Provider Bridge 302. The NNI priority values may be set by the network administrator during configuration.

The HSTP entity 408 similarly includes a plurality of sub-components, such as a port role selection state machine 434, a port transition state machine 436, a bridge protocol data unit (BPDU) message generator 438, and a formation boundary determination engine 440. The formation boundary determination engine 440, in turn, includes a comparator 442. The HSTP entity 408 preferably operates generally in accordance with either the Rapid Spanning Tree Protocol (RSTP), or the Multiple Spanning Tree Protocol (MSTP). RSTP is described in IEEE Std 802.1D-2004, whereas the MSTP is described in IEEE Std. 802.1Q-2003, both of which are hereby incorporated by reference in their entireties. The HSTP entity 408 includes or is in communicating relationship with a memory device or structure, such as HSTP memory 444, which may be a volatile or non-volatile random access memory (RAM) or some other memory device. Memory 444 is preferably organized to include a plurality of records or cells (not shown) for storing spanning tree related information or parameters such as the switch's Configuration ID, numeric bridge identifier (ID), the assigned path cost for each port 402a-e for each MSTI, the current or "best" spanning tree information for each port P0-P4 for each MSTI, etc. In addition to memory 444, the STP entity 408 further includes a VLAN ID (VID) to Multiple Spanning Tree Instance (MSTI) translation table 446 configured to store the mappings of VLANs to MSTIs.

In the preferred embodiment, memory 444 is further configured with one or more stratum IDs, which are transmitted in BPDU messages, as described herein.

Hierarchical Provider Service Instances

Within each formation, one or more Provider Service Instances (PSIs) are defined. The PSIs may be defined by network administrator action during configuration. Each PSI, moreover, is characterized by a Global PSI ID that uniquely identifies the PSI throughout the entire Grand Network 200. Associated with each PSI within a given formation is a corresponding Service VLAN (S-VLAN). By tagging and forwarding frames with an S-VLAN, the Provider Bridges within a given formation associate those frames with the PSI corresponding to that S-VLAN. PSIs are hierarchically defined. A PSI may, for example, correspond to a single Customer Service Instance (CSI). Alternately, multiple CSIs and/or PSIs may be aggregated into a new PSI. The tagging or encapsulation of a frame with S-VLANs, thereby associating the frame with a given PSI, only changes as the frame enters a formation from an NNI or a User Network Interface (UNI), which is a port that connects a formation directly to a customer network. In particular, a given frame may acquire an additional encapsulation or it may shed an existing encapsulation as the frame passes through an NNI or UNI in either an inbound or outbound direction.

Significantly, the hierarchical structure of the PSIs is such that any given PSI may only be immediately encapsulated by at most one other PSI within the entire Grand Network 200. A given higher level PSI may, however, be used to encapsulate more than one other lower level PSI. In other words, the PSIs operate in a hierarchical tree type structure, where the "root" PSIs are never themselves encapsulated, and at least some of the PSIs have other inner PSIs associated with them, and at least some of these PSIs similarly have their own PSIs associated with them and so on down to the CSIs or customer frames. Thus, each PSI, except for the root PSIs, belong to only one other PSI, and may "own" any number of lower level PSIs.

Execution of the Hierarchical Spanning Tree Protocol

Figure 1:
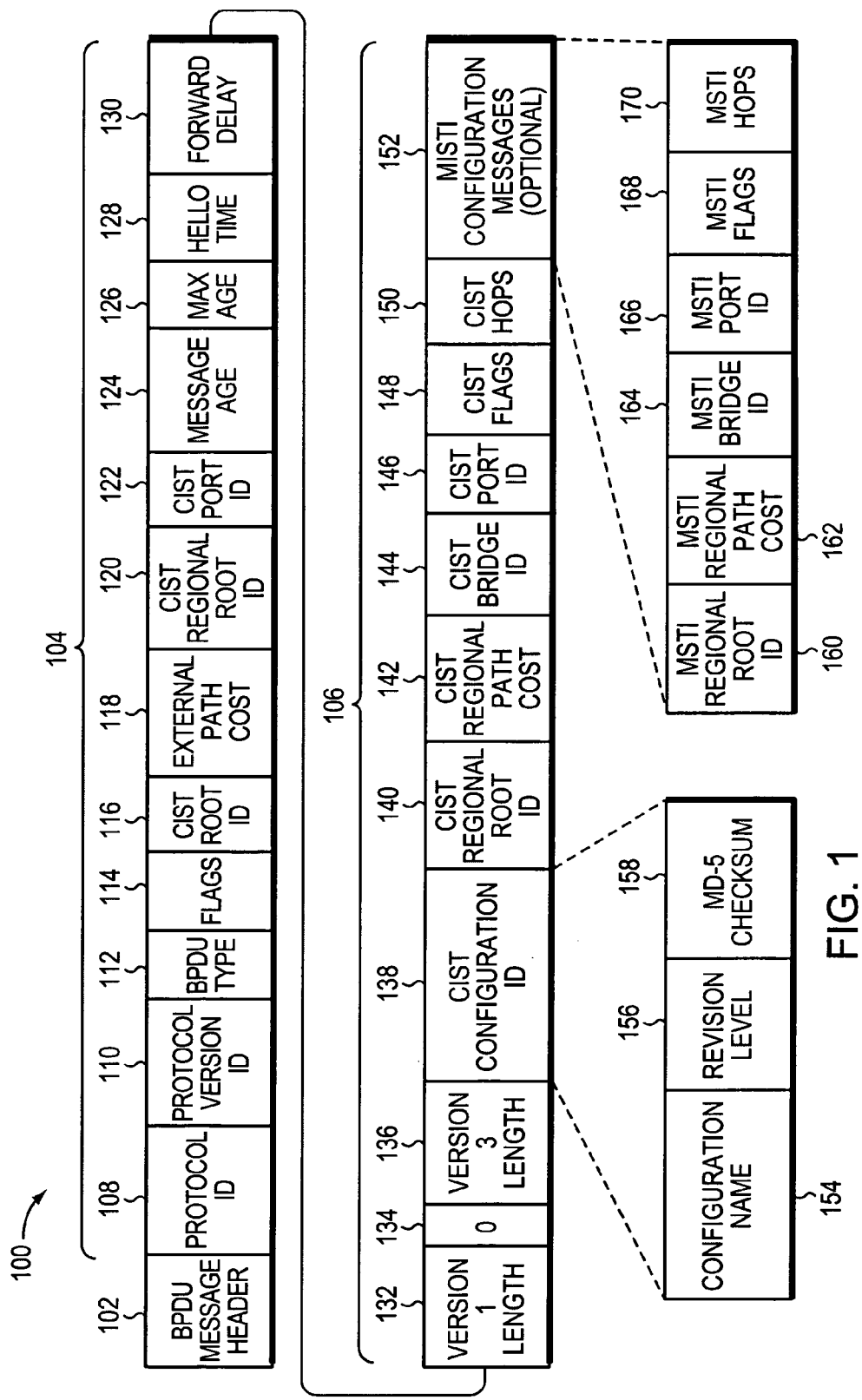
FIG. 1 previously discussed, is a schematic block diagram of a conventional configuration bridge protocol data unit in accordance with the Multiple Spanning Tree Protocol.

As indicated above, the Provider Bridges within each formation run HSTP to prevent the formation of loops within the formation. In the preferred embodiment, a Provider Bridge also uses HSTP to discover which of its neighboring Provider Bridges belong to the same formation and which belong to other formations. The message generator 438 of the HSTP entity 412 preferably generates HSTP MST BPDUs (HSTP-M BPDUs), having generally the same format as the conventional MST BPDU 100 of FIG. 1, except as described herein. In particular, the HSTP-M BPDU carries a different value in the protocol ID field 108 than that carried in a conventional MST BPDU 100. This new value identifies the BPDU as an HSTP-M BPDU, thereby distinguishing it from a conventional MST BPDU. In particular, the HSTP entities 412 of the Provider Bridges are configured to recognize this new protocol ID value as identifying the corresponding BPDU as a HSTP-M BPDU.

Figure 5:
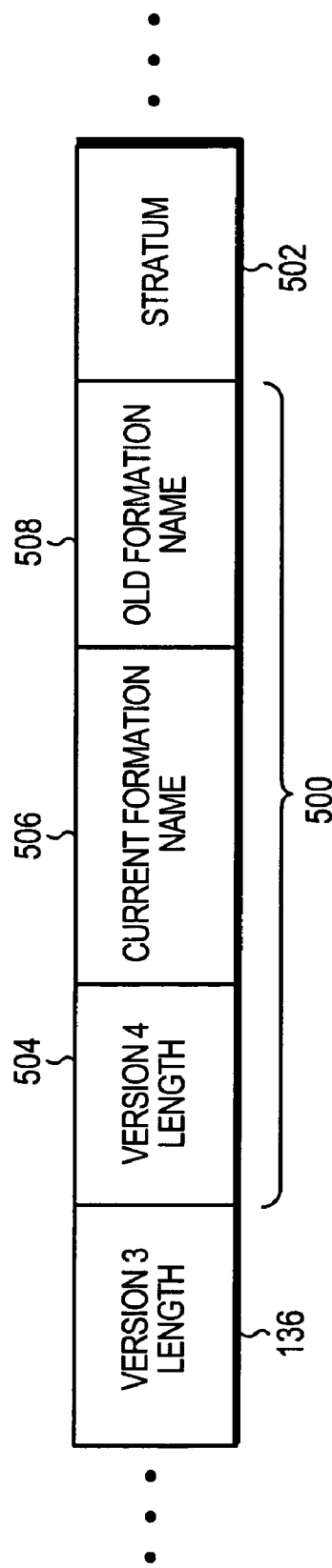
FIG. 5 is a partial schematic block diagram of a modified MSTP BPDU in accordance with a preferred embodiment of the present invention.

Furthermore, unlike a conventional MSTP BPDU, the HSTP entity loads the version 3 length field 136 of the HSTP-M BPDU with null or zero. Instead of having a MST Configuration ID field 138, moreover, the HSTP-M BPDU has a formation ID field 500 and a stratum field 502, as shown in FIG. 5. The formation ID field 500 includes a version 4 length field 504, a current formation name field 506, and an old formation name field 508.

The BPDU message generator 438 accesses the stratum, current formation name, and old formation name values from the PSI entity 408, and enters these values in fields 502, 506 and 508, respectively of the HSTP-M BPDU. The Provider Bridge 302 then forwards the HSTP-M BPDUs from its ports for receipt by its neighboring bridges. Similarly, Provider Bridge 302 receives BPDUs from neighboring bridges on its ports. These BPDUs are passed to the HSTP entity 412 for processing. If the BPDUs received by the Provider Bridge 302 carry the protocol ID value identifying them as HSTP-M BPDUs, the HSTP entity 412 evaluates the current formation name and old formation carried by these HSTP-M BPDUs. Specifically, the comparator 442 of the formation boundary determination engine 440 compares the stratum as well as the current and old formation names from the received HSTP-M BPDU with the stratum, current formation and old formation names stored at the PSI entity 408. It should be understood that the stratum, current formation name and old formation name values may alternatively or additionally be stored at HSTP memory 444. If either of the formation names carried in the received HSTP-M BPDU matches either of the formation names stored by the PSI entity 408, then the HSTP entity 412 concludes that the Provider Bridge that sent this HSTP-M BPDU is in the same formation as it is. The HSTP entity 412 then proceeds to process the received HSTP-M BPDU as described in the MSTP protocol.

If neither the current formation name nor the old formation name contained in the received HSTP-M BPDU matches the two formation names, then the HSTP entity 412 concludes that the Provider Bridge that issued this HSTP-M BPDU is disposed in a different formation. In this case, the port on which the non-matching HSTP-M BPDU was received is considered to be an NNI. The formation names from the received HSTP-BPDU, moreover, are used as inputs to determine the NNI's configuration parameters. The formation names from the received HSTP-BPDU are also used an inputs to GLRP. The rest of the received HSTP-M BPDU is ignored. Thus, both ends of this NNI link will continue to transmit HSTP-M BPDUs, but do not process them as part of the spanning tree algorithm. As described herein, the determination as to whether the NNI is placed in a blocked or forwarding spanning tree state for any given S-VLAN, is determined by execution of GLRP, and not by execution of HSTP.

If the Provider Bridge receives a BPDU that is not a HSTP-M BPDU on a given port 402, then the GLRP entity 410 transitions the port to a blocked state for all VLANs, similar to that imposed by the spanning tree protocols. The Provider Bridge nonetheless continues to transmit HSTP-M BPDUs from this port. If no BPDUs at all are received on a given port, then the GLRP entity 410 transitions the port to the blocked spanning tree state for all S-VLANs.

Referring to FIG. 3, bridge 302 will receive HSTP-M BPDUs on ports P0 and P1 from bridges 303 and 304, respectively. The formation names carried in these received HSTP-M BPDUs, moreover, will match the values stored at bridge 302. The HSTP entity 412 at bridge 302 thus determines that it is located in the same formation as bridges 303 and 304. By processing these HSTP-M BPDUs, bridges 302-304 may determine that link 310*a* should be blocked at bridges 304, as shown by the "X". Bridge 302 also receives HSTP-M BPDUs on ports P3, P4 and P5. However, none of the formation names contained in these received HSTP-M BPDUs will match the formation names at bridge 302. Thus, bridge 302 will conclude that ports P3, P4 and P5 are all NNIs.

As shown, by running HSTP, the Provider Bridges determine which neighboring bridges are part of the same formation, and block any loops within the formation. The Provider Bridges also identify those ports that couple the Provider Bridge to another formation, i.e., NNIs.

Execution of the GARP L2-NNI Registration Protocol (GLRP)

Another novel protocol of the present invention is the GARP L2-NNI Registration Protocol (GLRP). As described herein, Provider Bridges use GLRP to register, on other Provider Bridge ports within the same formation, lower NNIs and their associated PSIs, i.e., their S-VLANs. In the preferred embodiment, lower NNIs are configured through deliberate network administrator action. That is, one or more network administrators preferably configures, e.g., using a network management console and corresponding management software, including the Simple Network Management Protocol (SNMP), selected bridge ports within each formation of the Grand Network to be NNIs. An NNI is preferably configured with a list of the S-VLANs that may pass through the NNI, the name of the stratum and formation in which the NNI resides, the name of the stratum and formation to which the NNI is adjacent, and whether the NNI is lower or higher than the adjacent formation. If the NNI is configured as a lower NNI, then a priority is also configured for each MSTI to which at least one S-VLAN that has been configured pass through the lower NNI. This information may be stored at the GLRP memory 428.

Each Provider Bridge that has a port that has been configured as a lower NNI preferably constructs one or more globally unique NNI Identifiers (IDs) for that bridge port. The Provider Bridge then uses GLRP to register that NNI ID, along with the SVLANs that are allowed through the lower NNI, with all of the Provider Bridges within its own formation. Higher NNIs are not registered. Through GLRP registration, at most one lower NNI in a formation is enabled for any given S-VLAN. In other words, the Provider Bridges within each formation use GLRP to select the formation's "root port" for each S-VLAN. That is, frames associated with a given S-VLAN within a first formation that are to be forwarded to a higher-level formation can only pass through this one NNI. In this way, the formation of loops is between formations avoided. Except as noted herein, GLRP preferably operates in accordance with the procedures defined by GARP, which is described in IEEE Std 802.1D-1998, and is hereby incorporated by reference in its entirety.

Figure 6:
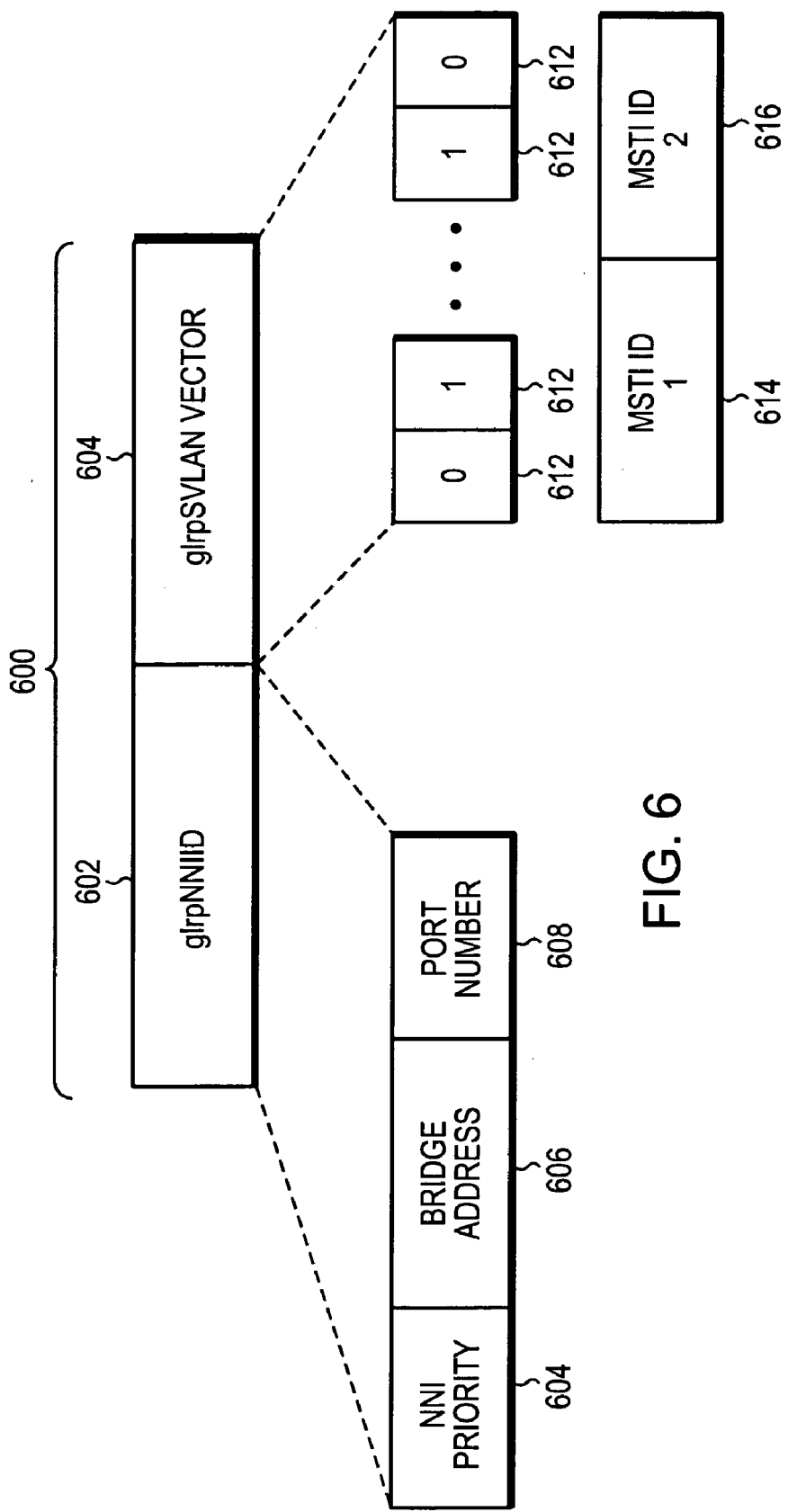
FIG. 6 is schematic block diagram of a GARP L2-NNI Registration Protocol (GLRP) registration value.

In the preferred embodiment, all Provider Bridges run GLRP. The values being registered by GLRP are: a globally unique NNI ID (glrpNNIId) for the lower NNI being registered, and a string (glrpSvlanVector) specifying in an indirect manner which of the S-VLANs can be transported through this lower NNI. FIG. 6 illustrates a preferred embodiment of a GLRP registration field 600, which includes a glrpNNIId field 602 and a glrpSvlanVector field 604. The glrpNNIId field 602 preferably includes a 1-octet NNI priority value field 604, a 6-octet Bridge Address field 606, a 2-octet Port Number field 608, and a 1-octet Stratum value field 610. The glrpSvlanVector field 602 may be a string of 1-bit flag fields 612 that is 4096 bits long, i.e., one bit for each MSTI ID. In the preferred embodiment, if a given flag field 612 is asserted, then all of S-VLANs associated with the MSTI ID corresponding to the bit position of that flag field within the string can be transported through this lower NNI. If a given flag field 612 is de-asserted, then the S-VLANs associated with the MSTI ID corresponding to the bit position of that flag field within the string cannot be transported through this lower NNI. The de-asserted octets from the tail of the glrpSvlanVector may be omitted to conserve memory and bandwidth.

Those skilled in the art will recognize that the glrpSvlanVector 604 may take other forms. For example, as also shown in FIG. 6, rather than a string of 1-bit flag fields, the glrpSvlanVector 604 may be formed from one or more MSTI ID fields, such as MSTI ID fields 614 and 616 that contain the MSTI IDs of the MSTIs that can be transported through this lower NNI. The Providing Bridge that is sending the GLRP packet may choose either form depending on the number of MSTI IDs being identified as transportable through this lower NNI.

The HSTP entity either alone or in cooperation with the PSI entity and/or the GLRP entity preferably checks that NNIs have been properly wired or connected. In particular, if it is discovered that a port configured as an NNI is in fact coupled to another bridge port having the same formation value, then the port preferably operates as a normal port interior to a formation as described above. The port does not act as a lower NNI, and GLRP does not register the port as a lower NNI within the formation. Such a port may be referred to as a "potential NNI", as it might later become an NNI through network changes. If it is determined that the formation value as received on a port configured as an NM does not match the adjacent formation value with which the NNI was configured, thereby indicating that the NNI has not been connected within the Grand Network as expected, then the PSI entity preferably blocks all S-VLANs at the port so as to prevent unplanned connectivity. Similarly, if the stratum value received on a port configured as an NNI does not match the adjacent stratum value with which the NNI was configured, then the PSI entity blocks all S-VLANs at the port. Also, if the stratum value contained in a received HSTP-M BPDU equals the stratum value with which the port has been configured, the PSI entity preferably blocks all S-VLANs at the port. Assuming the information in the received HSTP-M BPDU matches the values with which the NNI has been configured, then the port participates in GLRP, as described herein.

A port configured as a higher NNI and that receives information contained in one or more HSTP-M BPDUs bearing information confirming that it is indeed a higher NNI, preferably listens to messages issued in accordance with GVRP, and allows those SVLANs with which the port was configured as a higher NNI to be controlled by GVRP. That is, in order to avoid transmitting data from the higher NNI to the lower NII for S-VLANs that are blocked on the lower NNI due to the operation of GLRP, the lower NNI uses GVRP to register with the higher NNI those S-VLANs that are enabled for transmission through the lower NNI. In accordance with the normal operation of GVRP, the higher NNI suppresses the traffic in the unwanted S-VLANs. The PSI entity at such a higher NNI preferably blocks any S-VLANs for which it was not configured.

The two NNIs at the end of an NNI link may either be at the same level, or they may be at different levels, i.e., one NNI is higher than the other NNI. The Provider Bridge with the port corresponding to the higher NNI does not issue any GLRP packets. All S-VLANs that are to pass through the port in accordance with the configuration information may be sent from the higher NNI to the lower NNI via the NNI link. The Provider Bridge with the port corresponding to the lower NNI must, however, participate in GLRP and thus issue GLRP advertisements from this port.

HSTP-M

If the Provider Bridge having the lower NNI is running HSPT-M, and there are multiple NNI priorities for the MSTI IDs at the lower NNI, then separate GLRP registrations must be issued; one for each NNI priority value.

Those skilled in the art will recognize that it may be possible, in some circumstances, to merge GLRP registration values, especially for cases where one S-VLAN is enabled for two or more lower NNIs on the same Provider Bridge. Nonetheless, the merging of GLRP Registration Values may slow convergence time.

A GLRP Registration Value is preferably registered on each port of the Provider Bridge on which the S-VLANs in its glrpSvlanVector are in the forwarding spanning tree state. A GLRP Registration Value is preferably withdrawn from a port if the port leaves the forwarding spanning tree port state. If a Provider Bridge's MSTP configuration changes in such a way that it would change its GLRP Registration Values, then the Provider Bridge either un-registers its old values, or issues a GLRP LeaveAll message.

Each Provider Bridge is configured to collect and evaluate all of the GLRP Registration Values it has registered or is registering on its ports, and to prepare a list of "winners". That is, for each S-VLAN, each Provider Bridge must select the GLRP Registration Value with the best glrpNNIId. In the preferred embodiment, the best glrpNNIId is the numerically lowest one. If a Provider Bridge has a lower NNI, but determines that the glrpNNIId for this lower NNI is not the lowest glrpNNIId within the respective formation, then the port is placed in a blocking GLRP state for that S-VLAN. Only those. S-VLANs whose glrpNNIIds are determined to be the lowest may be placed in a forwarding GLRP state.

More specifically, for each S-VLAN that has been configured to pass through a lower NNI, the bridge compares the glrpNNIId value, which includes the NNI priority value, corresponding to that MSTI ID to which the S-VLAN belongs with the glrpNNIId from any GLRP registrations received for that same MSTI ID. If the bridge's glrpNNIId value is inferior (e.g., higher) than the received glrpNNIId value, then the S-VLAN and all other S-VLANs associated with that MSTI ID are blocked on the lower NNI. In this way, only one Provider Bridge within a given formation whose lower NNI has the "best" glrpNNIId value for a given MSTI ID will be forwarding for all of the S-VLANs that belong to that MSTI ID. If two glrpNNIId values are found to be the same, then the Provider Bridge preferably employs a tie breaker, such as its Bridge ID.

Furthermore, every Provider Bridge, whether it is running HSTP-R or HSTP-M, has an NNI priority value for the Common Internal Spanning Tree (CIST). In addition, a GLRP registration for the CIST, which corresponds to MSTI ID 0, must be carried in every GLRP control message. Whenever a GLRP control message passes from an HSTP-M Provider Bridge to a HSTP-R Provider Bridge, only the NNI priority for the CIST is retained. When a GLRP control message passes from a HSPT-R Provider Bridge to a HSTP-M Provider Bridge, the HSTP-M Provider Bridge converts it to a GLRP registration for all MSTI IDs, using the NNI priority for the CIST. Thus, two Provider Bridges having lower NNIs that are coupled to the same adjacent formation will receive multiple GLRP registrations with different NNI priorities for different MSTI IDs only where the two Provider Bridges are in the same MSTP region, and only if there is a path between them that traverses only HSTP-M Provider Bridges. In this case, the lower NNI at one Provider Bridge may serve some MSTI IDs, while the lower NNI at the other Provider Bridge may serve other MSTI IDs.

To handle transitions, the GLRP entities are preferably configured as follows. If a Provider Bridge receives a GLRP Registration Value for a glrpNNIId that turns out to be better, i.e., numerically lower, for some S-VLAN than any other information for that S-VLAN, then all of the affected S-VLANs on that port are placed in the blocking GLRP state until all of the other ports on the Provider Bridge acknowledge receiving the information. In this way, a new or changed lower NNI is equivalent to a received GLRP Registration Value. After notifying the other ports, the registering port may acknowledge Registration and return to the forwarding GLRP state. A Provider Bridge does not register an S-VLAN solely because of the existence of a lower NNI port. Whenever a port is notified by another port on that same Provider Bridge that a "better" glrpNNIId has been received, the affected S-VLANs on that port are placed in the blocking GLRP state. In addition, an Application engine (not shown) is started to register the new information and the S-VLANs are returned to the forwarding spanning tree state after the Application engine has reached the Quiet state.

It should be understood that the S-VLANs enabled for sending broadcast, multicast or unknown unicasts is the logical OR of the GVRP and GLRP registrations. As shown, whenever GLRP is out of sync on a port, the S-VLANs that are out of synch are placed in the blocked GLRP state.

To determine whether a packet tagged with an S-VLAN can be forwarded from a given port, the GLRP state (either forwarding or blocking) is logically ANDed with the spanning tree port state where the forwarding spanning tree state is assigned a value of "1" and all other spanning tree states are assigned a value of "0". If the result of the AND operation is "1", then the packet may be forwarded, otherwise it must be blocked.

To speed up convergence, the Provider Bridges of the present invention may employ the techniques of Compact GVRP, which is described in co-pending U.S. patent application Ser. No. 10/671,084 filed Sep. 25, 2003 entitled SYSTEM AND METHOD FOR REGISTERING AND UN-REGISTERING MEMBERSHIP IN VIRTUAL LOCAL AREA NETWORKS, which application is hereby incorporated by reference in its entirety.

Those skilled in the art will recognize that, rather than running GLRP, the Provider Bridges with lower NNIs may alternatively be configured to exchange NNI Keep Alive packets with the corresponding higher NNI.

As shown in FIG. 3, Provider Bridge 302 is coupled to formations 202, 203 and 205, and Provider Bridge 303 is coupled to formation 203. Accordingly, these bridges participate in GLRP to identify their lower NNIs, if any, and determine which lower NNIs may forward frames to the other formations. For bridge 302, port P3 is coupled to formation 205, which is a lower level formation than formation 204. Thus, port P3 corresponds to higher level NNIs. Port P4 is coupled to formation 202, which is at the same level as formation 204. Port P5 is coupled to formation 203, which is a higher level formation. Thus, port P5 is a lower level NNI. For bridge 303, it has one port coupled to lower level formation 205, and one port coupled to higher level formation 203. Thus, it too has one lower level NNI. For every S-VLAN defined in formation 204, only one of the lower level NNIs coupled to higher level formation 203, i.e., port P5 at bridge 302 or the port at bridge 303, will be forwarding.

Frame Encapsulation

When a frame enters the Grand Network through a UNI from a customer site, it acquires a new encapsulation. Thereafter, as the frame traverses the Grand Network, it either acquires a new encapsulation or translates an existing encapsulation as it passes through each NNI until the frame is encapsulated in a "root" PSI. Once it is encapsulated in a root PSI, the frame then either translates its existing encapsulation or loses an encapsulation as it passes through each NNI. Upon exiting the Grand Network into a customer network, the frame is stripped of its final encapsulation.

Figure 7:
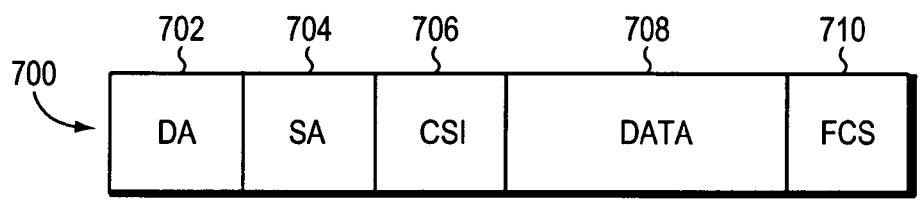
FIGS. 7-8 are schematic block diagrams of preferred formats of network messages in accordance with the present invention.

Suppose, for example, that a first customer frame is generated by a network entity within customer site 217 (FIG. 2) that is to be delivered to a network entity in customer site 214. FIG. 7 is a highly schematic illustration of a preferred format of a customer frame 700. Customer frame 700 includes a destination address (DA) field 702, a source address field (SA) 704, a VLAN tag field 706, a data field 708 and a frame check sequence (FCS) field 710. Those skilled in the art will recognize that customer frame 700 may include other fields depending on the L2 transmission protocol through which frame 700 is being transmitted. The network entity sourcing the customer frame enters the MAC address of the entity to which the frame is being sent in the DA field 702, and its own MAC address in the SA field 704. The network entity or some other network device within customer site 217, appends the VLAN tag field 706 and loads this field with the Customer Service Instance (CSI) value corresponding to the network entity sourcing the customer frame. The network entity also loads the data field 708 and the FCS field 710.

Figure 8:
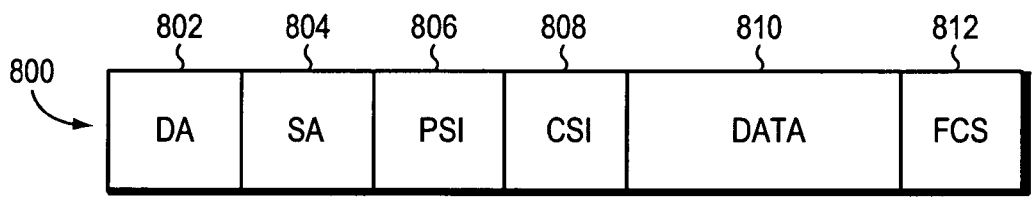

The customer frame is received at a port 402, e.g., port P2, designated as a UNI at Provider Bridge 302 (FIG. 3) within formation 204. Provider Bridge 303 performs a look-up in its CSI/PSI mapping table 422 using the CSI value contained in the VLAN tag field 706 of the received customer frame to identify the corresponding PSI value, from the next_outer_PSI column, for use by this frame as it traverses formation 204. Preferably, Provider Bridge 302 generates a new frame, which may be referred to as a formation frame, by adding this PSI value to the received customer frame 700. FIG. 8 is a highly schematic illustration of a preferred format of a formation frame 800. The formation frame 800, like the customer frame 700, includes a DA field 802 and a SA field 804. Unlike the customer frame, however, the formation frame also includes a PSI field 806, which is preferably loaded with the PSI value that was determined to correspond to the CSI value with which the received customer frame was tagged. The formation frame 800 further includes a VLAN tag field 808, which carries the frame's original CSI value, a data field 810 and a FCS field 812.

Bridge 302 determines that the frame, to reach customer site 214, must be forwarded to higher-level formation 203. Suppose that the lower NNI at bridge 302 that leads to higher level formation 203, i.e., port P5, is not forwarding for the PSI with which the formation frame 800 is tagged. In this case, bridge 302 must send the frame 800 to bridge 303. As it traverses formation 204, the format of formation frame 800 remains unchanged. In particular, neither the PSI value in field 806 nor the CSI value in field 808 are changed.

Formation frame 800 is received at Provider Bridge 303 and, based on upon the value in its DA field, the frame 800 is to be transmitted from its lower NNI to higher level formation 203. Before transmitting the formation frame 800 from the lower NNI at Provider Bridge 303 into the higher-level formation 203, the frame 800 is preferably encapsulated. Suitable encapsulation formats include the Q-in-Q frame format, which is described in IEEE draft Std. P802.1ad, the current version of which is draft 6.0, dated Aug. 18, 2005, which is hereby incorporated by reference in its entirety, and the Layer 2 Tunneling Protocol (L2TP) frame format, which is described in Internet Engineering Task Force (IETF) Request for Comments (RFC) 2661, which is also hereby incorporated by reference in its entirety.

Provider Bridge 303 also performs a look-up on its hierarchical PSI table using the PSI value contained in the PSI field 806 of the received formation frame 800 to derive the higher-level PSI within the hierarchical order of PSIs, which owns the PSI contained in PSI field 806 of the formation frame 800. The higher-level PSI may correspond to or be used to derive a pseudo-LAN value (W-VLAN) corresponding to this PSI. The derived pseudo-LAN value is used in the encapsulation. In the illustrative embodiment, the W-VLAN is inserted in place of the PSI field 806, and the frame is encapsulated in the higher formation's format.

Once generated, the encapsulated frame is transmitted from the lower NNI at Provider Bridge 303 for receipt within formation 203.

The encapsulated frame, as received in formation 203, is transmitted from a higher NNI for receipt by formation 202. In the preferred embodiment, frames are not modified for transmission from higher NNIs. Thus, the Provider Bridge within formation 203 that sends the encapsulated frame from its higher NNI makes no changes to the encapsulated frame.

Upon receipt of the encapsulated frame at the Provider Bridge within formation 202 having the lower NNI that is coupled to formation 203, this Provider Bridge determines that the PE DA value contained in the encapsulated frame matches its own bridge address. In this case, the Provider Bridge in formation 202 strips off the outer encapsulation and returns the frame to a formation frame format as shown in FIG. 8. Specifically, the Provider Bridge of formation 202 performs a look-up on its hierarchical PSI table using the pseudo-LAN value within the encapsulated frame to derive the S-VLAN within formation 202 that corresponds to this pseudo-VLAN. The Provider Bridge loads this S-VLAN value in the PSI field 806 of the recovered formation frame 800. When the formation frame reaches the Provider Bridge disposed within formation 202 that is coupled to customer site 214, this Provider Bridge determines that the formation frame is to be forwarded from a UNI into customer site 214. As a result, the Provider Bridge translates the formation frame back into the format of a customer frame as shown in FIG. 7. Specifically, the Provider Bridge performs a look-up on its hierarchical PSI table using the S-VLAN value contained in PSI field 806 of the intra-formation frame to derive the CSI value associated with this PSI. The Provider Bridge loads this CSI value in field 706 and forwards the frame from its UNI coupled to customer site 214.

If the encapsulated frame were to be transmitted from a lower NNI within formation 203, then a new higher level PSI for loading in higher level PSI field 808 would be generated. However, the pseudo-LAN value remains unchanged.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate network device for use in a network having a plurality of formations organized into levels, each formation including two or more interconnected intermediate network devices, a method for preventing the formation of loops in the network, the method comprising:

defining at least one Provider Service Instance (PSI) at the intermediate network device;

designating at least one port of the device for connection to a higher level formation, relative to the formation of the device, as a lower network-network interface (NNI);

assigning a priority to the lower NNI;

determining whether the assigned priority is a best priority for the at least one PSI as compared to one or more other lower NNIs by generating one or more registration messages, the one or more registration messages indicating the at least one PSI and the assigned priority, receiving one or more registration messages associated with the other lower NNIs, each of the one or more received registration messages carrying an other assigned priority for the at least one PSI, and comparing the other assigned priority for the at least one PSI;

blocking the lower NNI from sending messages tagged with the at least one PSI where the other assigned priority is determined to be better than the priority assigned by the device to the lower NNI; and enabling messages tagged with the at least one PSI to pass through the lower NNI, where the assigned priority is determined to be the best priority.

2. The method of claim 1 further comprising associating the at least one PSI with a Multiple Spanning Tree Instance (MSTI) Identifier (ID), wherein the one or more registration messages specify the at least one PSI through the associated MSTI ID.

3. The method of claim 2 wherein the formation in which the device is located supports a plurality of MSTI IDs, and each of the one or more registration messages is configured with a bit vector whereby each bit of the bit vector corresponds to one of the plurality of MSTI IDs.

4. In an intermediate network device for use in a network having a plurality of formations organized into levels, each formation including two or more interconnected intermediate network devices, a method for preventing the formation of loops both within a given formation and between the formations, the method comprising:

identifying one or more other devices that are located within the given formation;

cooperating with the other devices identified as being located within the given formation to define one or more active topologies within the given formation;

forwarding data messages along the one or more active topologies;

identifying one or more other devices that are located outside of the given formation;

defining at least one Provider Service Instance (PSI) at the intermediate network device;

designating at least one port of the device for connection to a higher level formation, relative to the formation of the device, as a lower network-network interface (NNI);

assigning a priority to the lower NNI;

determining whether the assigned priority is a best priority for the at least one PSI by generating one or more registration messages, the one or more registration messages indicating the at least one PSI and the assigned priority, receiving one or more registration messages associated with the other lower NNIs, each of the one or more received registration messages carrying an other assigned priority for the at least one PSI, and comparing the other assigned priority for the at least one PSI;

if the assigned priority is not the best priority, blocking the lower NNI designated port from sending messages tagged with the at least one PSI; and if the assigned priority is the best priority, enabling messages tagged with the at least one PSI to pass through the lower NNI designated port, wherein the device is free from cooperating in the creation of any active topologies that extend beyond the given formation.

5. The method of claim 4 further wherein the identifying one or more other devices that are located within the given formation is based upon information contained in one or more Spanning Tree Protocol (STP) control messages received from the other devices located within the given formation.

6. The method of claim 5 further comprising processing the one or more STP control messages received from the other devices located within the given formation to define the one or more active topologies.

7. The method of claim 4 further wherein the identifying one or more other devices that are located outside of the given formation is based upon information contained in one or more Spanning Tree Protocol (STP) control messages received from the other devices located outside of the given formation.

8. The method of claim 7 further comprising discarding without processing the one or more STP control messages received from the other devices identified as being located outside of the given formation.

9. An apparatus for use in a network having a plurality of formations organized into levels, each formation including two or more interconnected intermediate network devices, comprising:

a plurality of ports including transmitting and receiving circuitry;

a Provider Service Instance (PSI) entity;

a Generic Attribute Registration Protocol (GARP) L2 Registration Protocol (GLRP) entity; and a Hierarchical Spanning Tree Protocol (HSTP) entity, wherein the PSI entity to maintain at least one Provider Service Instance (PSI), wherein the GLRP entity is configured to register at least one port of the apparatus for connection to another formation as a lower network-network interface (NNI), and to register an assigned priority to the lower NNI, by generation of one or more registration messages that indicate at least one PSI and the assigned priority, and wherein the HSTP entity is configured to determine whether the assigned priority is a best priority for the at least one PSI as compared to one or more other lower NNIs by examination of one or more received registration messages associated with the other lower NNIs, each of the one or more received registration messages carrying an other assigned priority for the at least one PSI, and comparison of the other assigned priority for the at least one PSI, and the HSTP entity is configured to block the lower NNI from sending messages tagged with the at least one PSI where the other assigned priority is determined to be better than the assigned priority, and to enable messages tagged with the at least one PSI to pass through the lower NNI, where the assigned priority is determined to be the best priority.

10. The apparatus of claim 9 wherein there is an association of the at least one PSI with a Multiple Spanning Tree Instance (MSTI) Identifier (ID).

11. The apparatus of claim 10 wherein the one or more registration messages specify the at least one PSI through the associated MSTI ID.

12. The apparatus of claim 9 wherein a formation in which the apparatus is located supports a plurality of MSTI IDs.

13. The apparatus of claim 12 wherein each of the one or more registration messages is configured with a bit vector and each bit of the bit vector corresponds to one of the plurality of MSTI IDs.

* * * * *

UNITED STATES PATENT AND TRADEMARK OFFICE
CERTIFICATE OF CORRECTION

PATENT NO.         : 7,821,972 B1
APPLICATION NO.    : 11/238925
DATED              : October 26, 2010
INVENTOR(S)        : Norman W. Finn et al.

Page 1 of 1

It is certified that error appears in the above-identified patent and that said Letters Patent is hereby corrected as shown below:

Col. 2, Line 64, remove "to"

Col. 14, Line 53, replace "NM" with --NNI--

Col. 20, Line 60, replace "entity to" with --entity is configured to--

Signed and Sealed this
Tenth Day of May, 2011

David J. Kappos
*Director of the United States Patent and Trademark Office*